US000001354H

United States Statutory Invention Registration [19]

[11] Reg. Number: H1354

Martinez

[43] Published: Sep. 6, 1994

[54] OPTICAL DATA TRANSDUCER

[75] Inventor: Otto R. Martinez, Fort Walton Beach, Fla.

[73] Assignee: The United States of America as represented by the Secretary of the Air Force, Washington, D.C.

[21] Appl. No.: 772,199

[22] Filed: Oct. 7, 1991

[51] Int. Cl.[5] ..... G01J 1/00

[52] U.S. Cl. ..... 250/352; 250/330; 250/332; 250/349

[58] Field of Search ..... 250/352, 332, 349, 330

[56] References Cited

U.S. PATENT DOCUMENTS

| | | | |
|---|---|---|---|
| 4,495,782 | 1/1985 | Salour et al. | 62/514 R |
| 4,528,449 | 7/1985 | Gordon et al. | 250/352 |
| 4,546,614 | 10/1985 | Kline et al. | 62/62 |
| 4,682,032 | 7/1987 | Barrett | 250/352 |
| 4,802,345 | 2/1989 | Curtis | 62/514 |
| 4,810,888 | 3/1989 | Boss | 250/352 |
| 4,810,978 | 3/1989 | Sato et al. | 250/332 |
| 4,819,451 | 4/1989 | Hingst | 62/514 |
| 4,851,684 | 7/1989 | Martin et al. | 250/352 |
| 4,918,308 | 4/1990 | Neitzel et al. | 250/352 |
| 4,918,312 | 4/1990 | Wellman et al. | 250/352 |
| 4,918,929 | 4/1990 | Chudy et al. | 62/51.1 |
| 5,118,946 | 6/1992 | Smith | 250/349 |

*Primary Examiner*—Bernarr E. Gregory

*Attorney, Agent, or Firm*—Donald J. Singer; Bobby D. Scearce

[57] ABSTRACT

An optical data transducer system is described which comprises a cryogenic dewar for containing an infrared focal plane array at low temperature and an optical spatial light modulator, collimated laser beam and associated optical train and detector for efficient extraction of information from the array.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL DATA TRANSDUCER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical data transducer devices, and more particularly to an improved cryogenic dewar and optical data transducer system configured to efficiently extract information from within the dewar using a spatially modulated low power laser beam.

Sensitive infrared focal plane arrays (IRFPA) normally must be disposed within a cryogenic dewar for operation at low temperature. In the operation of an IRFPA, high data rates are necessary in order to efficiently extract information from the dewar to an externally located detection system. In conventional systems, high data extraction rates carry a corresponding penalty of a need for a large number of electrical leads from the dewar. As a result, severe vacuum loss and heat leak problems arise.

The invention solves or substantially reduces in critical importance problems with prior art systems as just described by providing a cryogenic dewar and optical transducer system comprising an optical spatial light modulator in conjunction with a collimated laser probe beam and an IRFPA for efficient extraction of information from the IRFPA using a maximum of four electrical leads (system clock, ground, and two power leads) to the dewar. The invention has substantial application in systems using cryogenically cooled infrared detectors, such as infrared search and track sets, guidance systems and imaging systems.

It is therefore a principal object of the invention to provide an improved optical transducer system.

It is another object of the invention to provide a cryogenic dewar improved with an optical data transducer to extract information from the dewar.

It is yet another object of the invention to provide a cryogenic dewar and optical spatial light modulator and collimated laser beam system for efficient extraction of information from a cryogenically cooled IRFPA using a minimum of electrical leads.

It is yet another object of the invention to provide a combined reflective spatial light modulator and IRFPA.

These and other objects of the invention will become apparent as a detailed description of representative embodiments proceeds.

SUMMARY OF THE INVENTION

In accordance with the foregoing principles and objects of the invention, an optical data transducer system is described which comprises a cryogenic dewar for containing an infrared focal plane array at low temperature and an optical spatial light modulator, collimated laser beam and associated optical train and detector for efficient extraction of information from the array.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
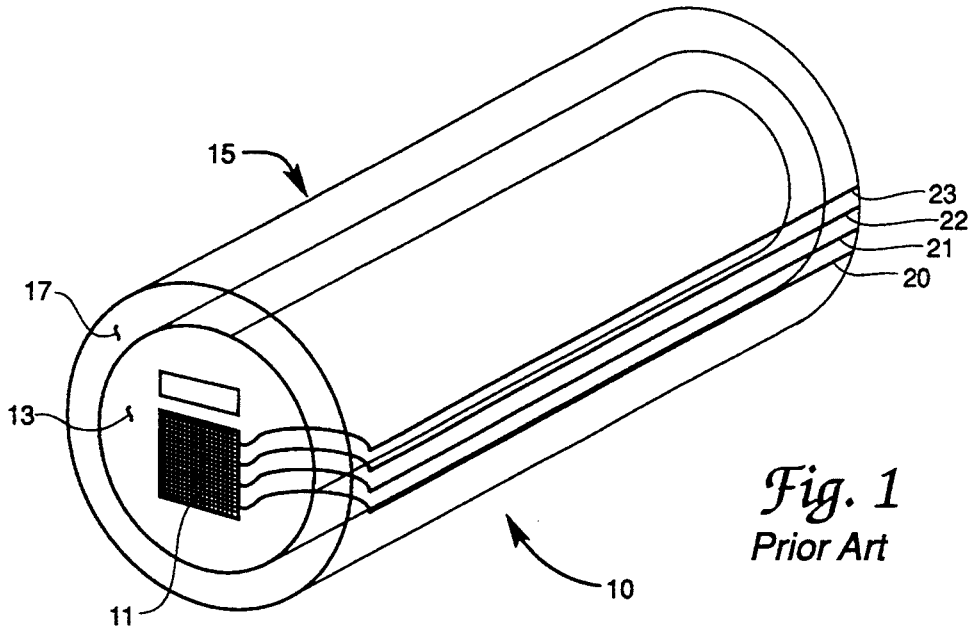
Fig. 1 Prior Art
FIG. 1 is a schematic perspective view of a conventional dewar system for cooling a sensitive infrared focal plane array.

Referring now to the drawings, FIG. 1 shows a schematically a perspective view of a conventional dewar system 10 for cooling a sensitive infrared focal plane array 11. In conventional designs as represented by system 10, array 11 is immersed in a cryogen 13 such as liquid argon, liquid nitrogen or liquid helium within a heat conduction to array 11. Array 11 normally operates within a dewar cooled below about −200° C. Data, control and power lines 20–23 interconnect array 11 and electronics (not shown) external of container 15 and may be disposed within container 15 or etched on a wall thereof. In the operation of array 11, high data rates may be necessary to extract information from array 11 to a data processor external of system 10, and may dictate the need for an undesirably great number of electrical leads (well in excess of the four suggested in FIG. 1) for data extraction purposes. The greater number of leads may result in substantial vacuum loss and heat leak problems for system 10.

Figure 2:
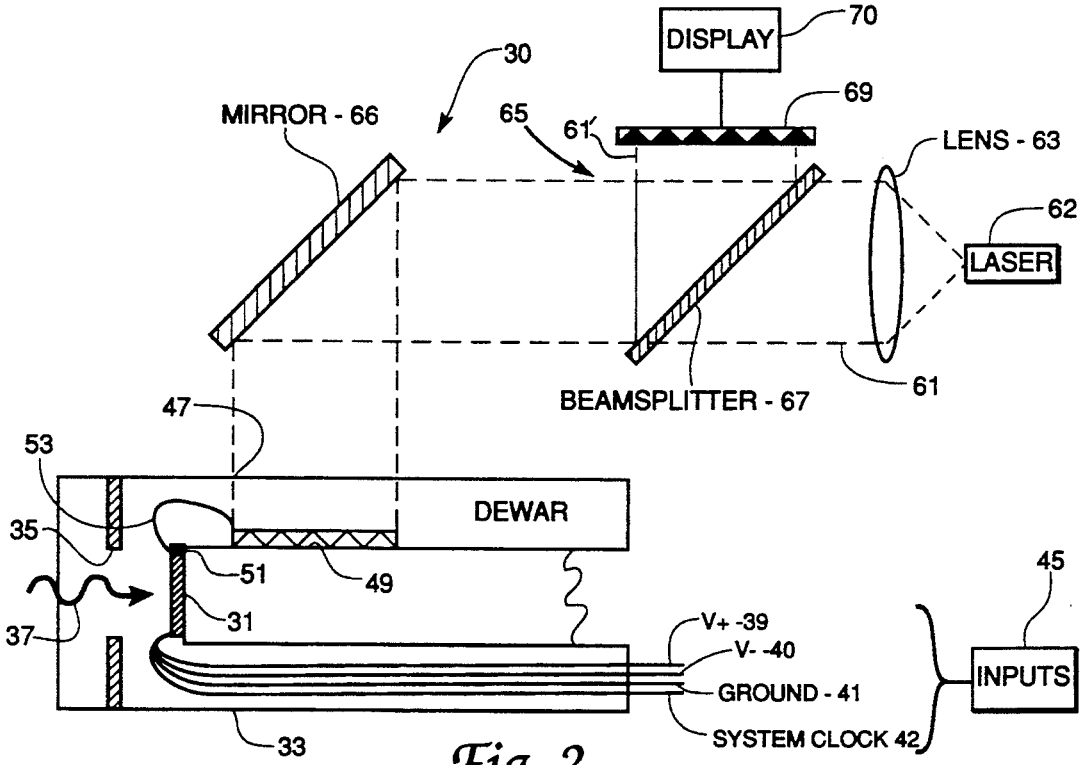
FIG. 2 is a schematic layout of an optical transducer system and modified dewar according to the invention including associated external optics and electronics.

Referring now to FIG. 2, shown therein is a schematic layout of an optical transducer system 30 constructed according to the invention, including associated external optics and electronics. Infrared focal plane array 31 may, in substantially conventional fashion, be mounted within dewar 33 near an optical window 35 through a wall of dewar 33 for receiving an external signal in the form of infrared radiation 37. No more than four electronic leads 39–42 interconnect array 31 and input electronics 45 disposed external of dewar 33, providing input for a system clock, power (−V and +V) and ground.

In accordance with a principal feature of the invention, an optical window 47 is defined in a wall of dewar 33 through which data may be extracted from system 30. A reflective spatial light modulator 49 (such as a deformable mirror array) is disposed on the cold finger of dewar 33 confronting window 47 as suggested in FIG. 2. Modulator 49 is operatively connected through amplifier bank 51 to array 31 via bus 53 comprising any suitable number of electrical leads.

Figure 3:
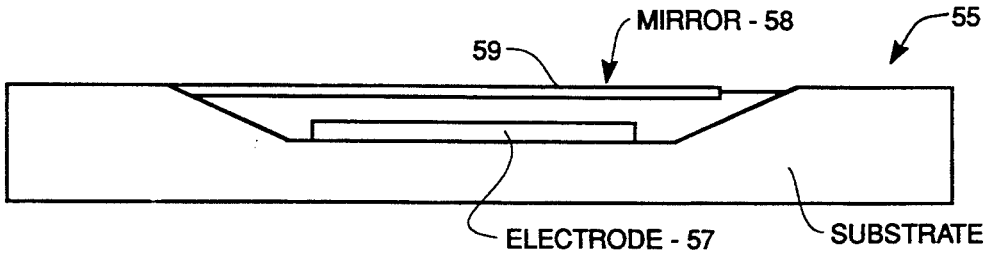
FIG. 3 is a schematic cross-sectional view of a micro mirror which the deformable mirror array of the invention may comprise.

A deformable mirror array may be preferred for use in system 30 because spatial light modulators based on liquid crystals may be inoperative at the cryogenic temperatures contemplated for operation of system 30. FIG. 3 schematically illustrates in section typical construction of a micro mirror segment 55 of which the deformable mirror array is comprised. Each mirror segment 55 is about $6\times10^{-7}$ to $4\times10^{-5}$ square inch in area, and comprises a substrate 56 of p or n type semiconductor material, such as silicon or gallium arsenide. A driving electrode 57 of aluminum, gold or silver is deposited on substrate 56 and is operatively connected to an electrical lead (not shown) included in bus 53. Mirror 58 supporting a mirrored surface 59 is deposited or otherwise disposed on substrate 56 over electrode 57 as suggested in FIG. 3. Mirrored surface 59 may comprise aluminum, silver or other suitable metallic. Each mirror 58 of each mirror segment 55 may be fabricated by microscopic machine construction techniques or other method occurring to one skilled in the applicable art. Each mirror 58 is structured as a cantilevered plate which is deformed to a degree corresponding to the amount of electrical current applied to energize the corresponding electrode 57. A laser probe beam 61 is projected from a source 62 thereof and may be collimated by collimating lens 63 (FIG. 2). Probe beam 61 is incident onto modulator 49 comprising such as an array of mirror segments 55. Each mirror segment 55 in the array cooperates with other segments 55 to shift the phase and/or amplitude of beam 61 in proportion to the current applied to the segment. Beam 61 is therefore modulated by signals from array 31 to modulator 49 (represented by the array of mirror segments 55). An optical train 65 including any required number of optical elements such as mirror 66 and beamsplitter 67 direct the incident beam 61 to modulator 49 and direct the modulated beam 61' to a detector system such as charged couple device (CCD) photodiode array 69 and display 70, digital processor or other detector system.

Figure 4:
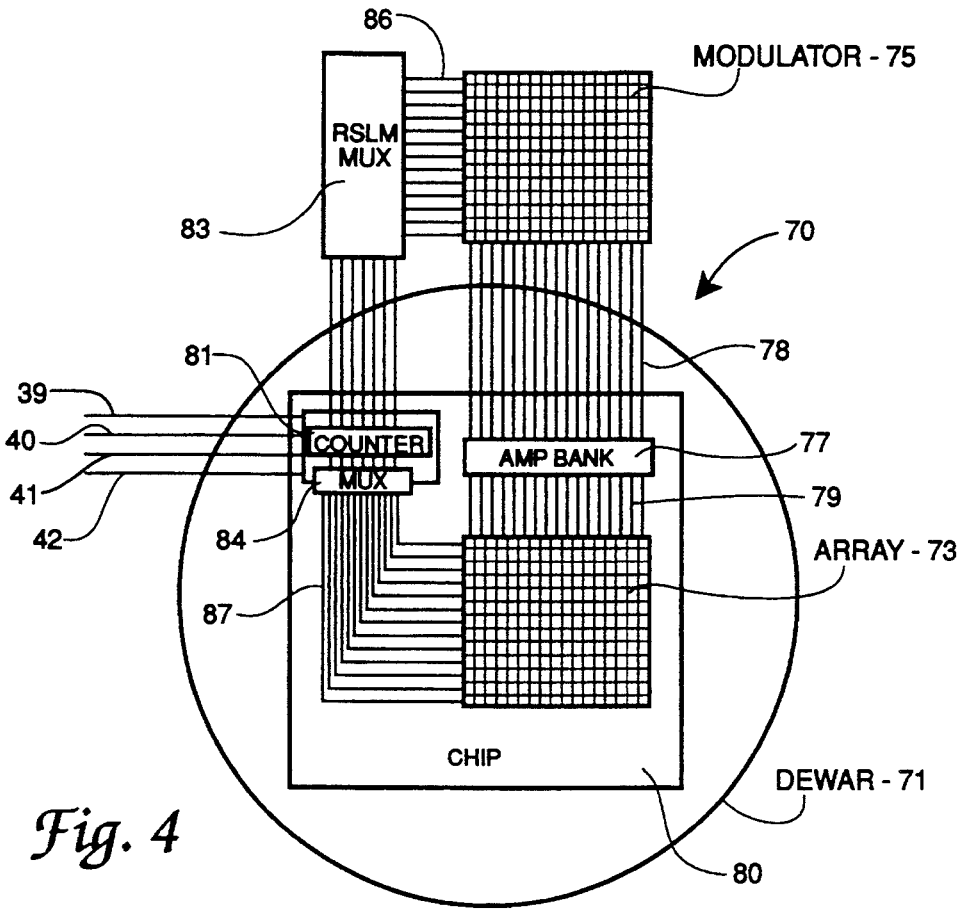
FIG. 4 is a schematic of a basic transducer layout within a dewar for illustrating the general operation of the invention.

Referring now to FIG. 4, shown therein is a schematic of a basic transducer layout 70 contained within dewar 71 in accordance with a principal teaching of the invention. As suggested in the foregoing paragraphs, an N×N infrared focal plane array 73 and N×N reflective spatial light modulator 75 may be disposed within dewar 71 and interconnected by amplifier bank 77 and buses 78,79. Array 73 and amplifier bank 77 may be carried on IC chip or ceramic carrier 80 as would occur to the skilled artisan practicing the invention. Counter 81 interconnects inputs 39–42 and multiplexers 83,84 connected by buses 86,87 to modulator 75 and array 73.

In the operation of the arrangement suggested in FIG. 4, at the application of power, counter 81 is initially reset to mark the beginning of a frame period and increases in value at the occurrence of each following cycle of the system clock. The value impressed upon counter 81 is decoded by multiplexers 83,84 which allows a single line for data from a row or column (depending on read-out structure) to be applied to a row of electrodes within array 73. The set of column or row data is then presented to amplifier bank 77 which amplifies the signals for transmission over bus 78 to modulator 75 and applied to the corresponding row or column of reflective elements on modulator 75. The value on counter 81 is then increased on the next cycle of the system clock to enable the set of row or column data for transfer to modulator 75. The foregoing process following initial reset of counter 81 is then repeated for the rest of the rows or columns during the frame period until modulator 75 contains the image transferred from array 73. Modulator 75 is then illuminated from outside dewar 71 by a low power laser (61 of FIG. 2). The laser light reflected by modulator 75 (beam 61' of FIG. 2) is encoded with an image from array 73 and is directed a detector system as suggested above. The process described within this paragraph defines one frame period, and counter 81 is again reset and the entire sequence is repeated for each following frame period. Since data from array 73 is transferred outside dewar 71 using no data lines, the number of operating leads (39–42) is but four.

Figure 5:
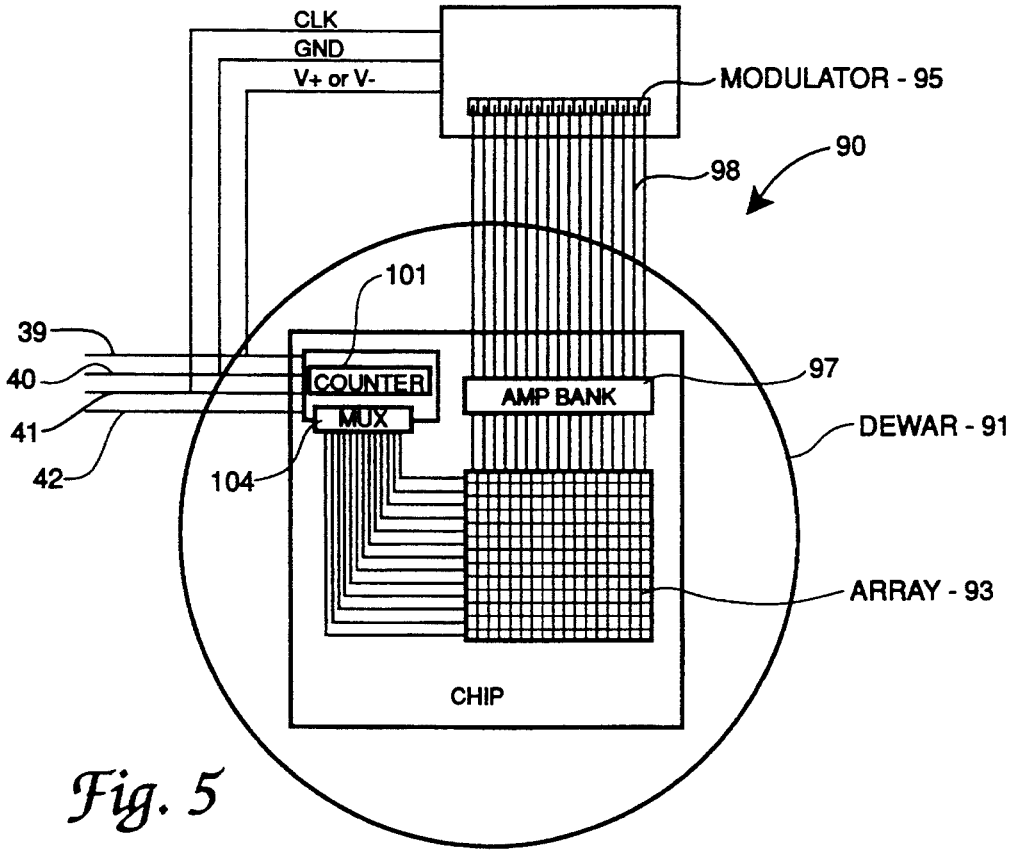
FIG. 5 is a schematic of an alternative transducer system within a dewar using a two dimensional infrared focal plane array and a one dimensional spatial light modulator.

FIG. 5 illustrates an alternative transducer system 90 within dewar 91 using two dimensional infrared focal plane array 93 and one dimensional modulator 95 for two dimensional to one dimensional data transfer according to an aspect of the invention. In operation of system 90, at the application of power, counter 101 is initially reset to mark the beginning of a frame period and increases in value at the occurrence of each following cycle of the system clock. The value impressed on counter 101 is decoded by multiplexer 104 which enables a single line for data from a row or column (depending on read-out structure) to be applied to a row of electrodes within array 93. The set of column or row data is then presented to amplifier bank 97 which amplifies the signals for transmission over bus 98 to linear modulator 95. Modulator 95 is then illuminated by a low power laser (61 of FIG 2), the reflected beam (beam 61' of FIG. 2) being encoded with an image of a single row of array 93 and directed a detector system. The value on counter 101 is then increased on the next cycle of the system clock to enable the next row or column for transfer to modulator 95. The process is then repeated for the remaining rows during the frame period until the entire image from array 93 is transferred to the digital or optical processor external of dewar 91. Counter 101 is then reset to the first row of array 93 and the sequence repeated for each following frame period.

Figure 6:
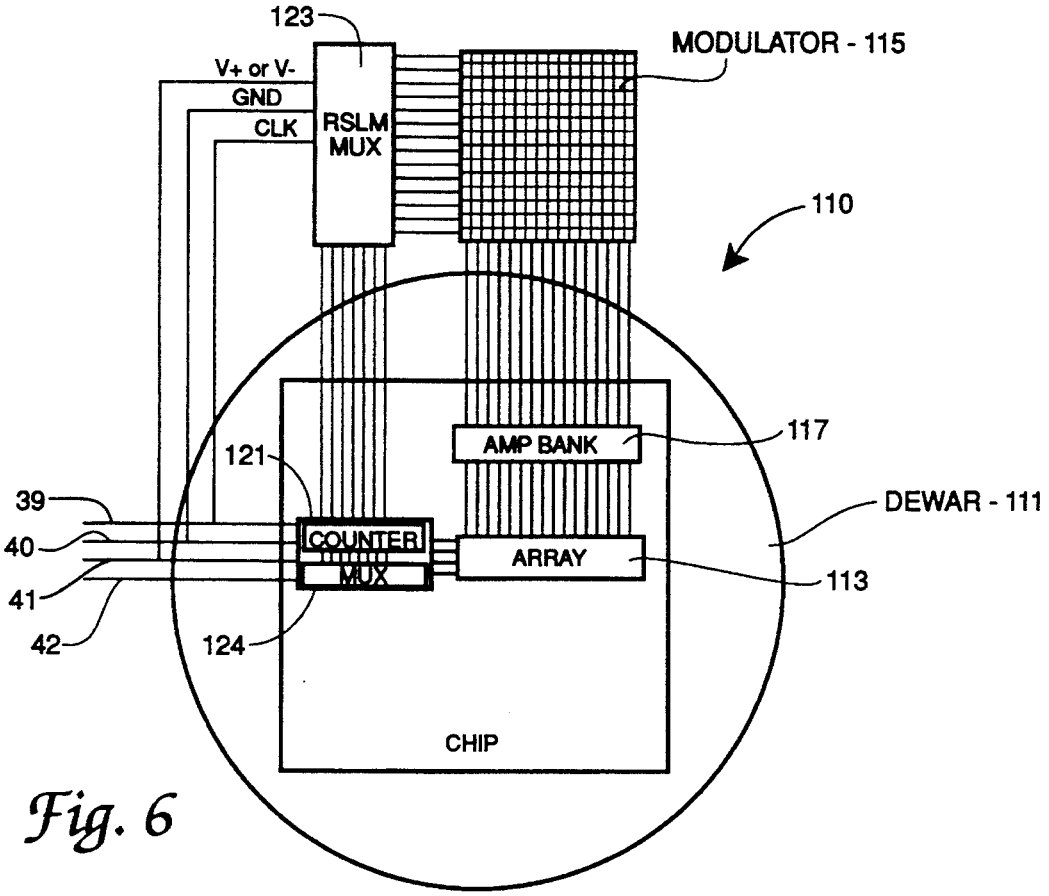
FIG. 6 is a schematic of another transducer system within a dewar using a one dimensional infrared focal plane array and a two dimensional spatial light modulator according to a further aspect of the invention.

FIG. 6 illustrates yet another transducer system 110 within dewar 111 using one dimensional infrared focal plane array 113 and two dimensional modulator 115 for one dimensional to two dimensional data transfer according to yet another aspect of the invention. No counter is needed for array 113 since but a single line of information exists therein. The clock cycle may be used to cycle array 113. Counter 121 records the image gathered by array 113 on modulator 115. In the operation of system 110, the clock signal activates transfer of data to the row electrodes of array 113 and counter 121 of modulator 115 is set to a value corresponding to the first row of the image to be scanned. The row data from array 113 is then transferred to the amplifier bank 117 for transmission to modulator 115 and applied to the row of modulator 115 corresponding to the row in the image being scanned. The value on counter 121 is then increased to coincide with the next row of imagery from (linear) array 113, and the foregoing process is repeated until modulator 115 contains the entire image scanned by array 113. Modulator 115 is then illuminated by a low power laser as above to encode the reflected beam with the image stored in modulator 115 and to direct the encoded beam to a detector, which marks the end of a frame period. Counter 121 is then reset to the top row of modulator 115 and the sequence repeated for each following frame period.

Figure 7:
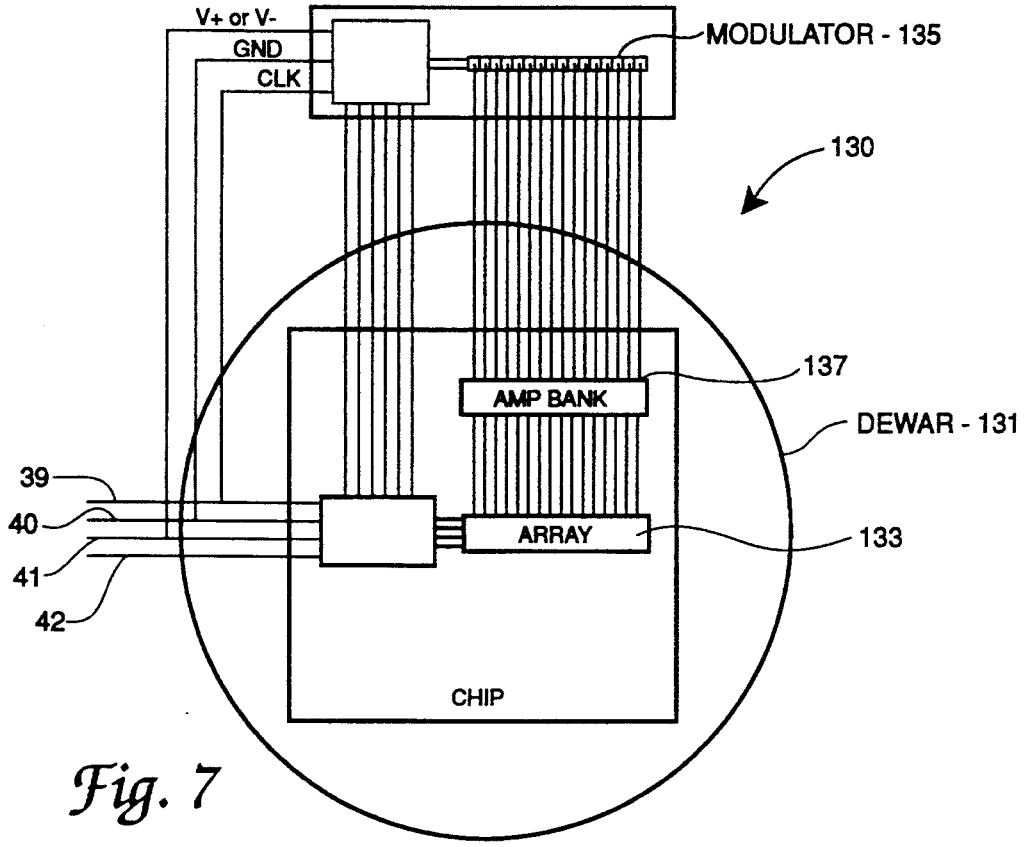
FIG. 7 is a schematic of yet another transducer system within a dewar using a one dimensional infrared focal plane array and a one dimensional modulator.

FIG. 7 illustrates another transducer system 130 within dewar 131 using one dimensional infrared focal plane array 133 and one dimensional modulator 135 for one dimensional to one dimensional data transfer according to the invention. No counter is needed in system 130 since there is only a single line of information. The clock cycle is used to cycle array 133 and modulator 135. In operation of system 130, the clock signal activates data transfer to the row electrodes of array 133. The row data is amplified by amplifier bank 137 and transmitted to modulator 135. Modulator 135 is then illuminated by a low power laser as above to encode the reflected beam with the image stored in modulator 135 and to direct the encoded beam to a detector.

The invention therefore provides an improved cryogenic dewar and optical data transducer system configured with a minimum number of electrical input leads and wherein data is efficiently extracted from the dewar optically and in parallel allowing high frame rates without corruption of the data during transmission. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A cryogenic data transducer system, comprising:

(a) a cryogenic dewar having optical window means therein for admitting an optical signal and a probe beam;

(b) an infrared focal plane array disposed within said dewar near said optical window means for receiving an optical signal from external of said dewar;

(c) a spatial light modulator disposed within said dewar near said optical window means, said spatial light modulator being operatively connected to said infrared focal plane array;

(d) a source of a collimated laser beam source and optical means for directing a probe beam from said source onto said spatial light modulator through said optical window means and directing a reflected beam external of said dewar from said spatial light modulator; and (e) detection means for detecting and analyzing said reflected beam.

2. The system of claim 1 further comprising a cryogen within said dewar for maintaining the temperature of said infrared focal plane array below about −200°C.

3. The system of claim 2 wherein said cryogen is selected from the group consisting of liquid argon, liquid nitrogen and liquid helium.

4. The system of claim 1 wherein said spatial light modulator comprises a deformable mirror array operatively connected to said infrared focal plane array and responsive thereto.

5. In a cryogenic data transducer system including a cryogenic dewar and an infrared sensor array disposed within the dewar for receiving an optical signal external of the dewar, an improvement comprising:

(a) optical window means on said dewar for admitting a probe beam;

(b) a spatial light modulator disposed within said dewar near said optical window means, said spatial light modulator being operatively connected to and responsive to said infrared sensor array;

(c) a source of a collimated laser beam source and optical means for directing a probe beam from said source onto said spatial light modulator through said optical window means and directing a reflected beam external of said dewar from said spatial light modulator; and (d) detection means for detecting and analyzing said reflected beam.

6. The improvement of claim 5 further comprising a cryogen within said dewar for maintaining the temperature of said infrared focal plane array below about −200° C.

7. The improvement of claim 6 wherein said cryogen is selected from the group consisting of liquid argon, liquid nitrogen and liquid helium.

8. The improvement of claim 5 wherein said spatial light modulator comprises a deformable mirror array operatively connected to said infrared focal plane array and responsive thereto.

* * * * *